United States Patent [19]

Kodama et al.

[11] Patent Number: 5,443,879
[45] Date of Patent: Aug. 22, 1995

[54] LONGITUDINAL MAGNETIC RECORDING MEDIUM EXHIBITING VARIOUS COERCIVITIY RELATIONSHIPS

[75] Inventors: Naoki Kodama, Kamakura; Hiroyuki Suzuki, Odawara, both of Japan

[73] Assignee: Hitachi, Ltd., Tokyo, Japan

[21] Appl. No.: 117,330

[22] Filed: Sep. 7, 1993

[30] Foreign Application Priority Data

Sep. 9, 1992 [JP] Japan ................................. 4-240585

[51] Int. Cl.6 ............................ B32B 3/02; G11B 5/66; G11B 5/70
[52] U.S. Cl. ................................ 428/65.7; 428/694 B; 428/694 BS; 428/695 BP
[58] Field of Search ....... 428/694 B, 694 BS, 694 BP, 428/64

[56] References Cited

U.S. PATENT DOCUMENTS 5,256,481 10/1993 Miyake et al. ........................ 428/336

OTHER PUBLICATIONS

A research paper, Telecommunications Society, Magnetic Recording Research Group, research data MR 67-18 (1967), pp. 1-16. Considered to the extent of the discussion pertaining to this paper in the specification. IEEE Transactions on Magnetics, MAG-20, No. 1, Jan. 1984, pp. 81-83.

*Primary Examiner*—Paul J. Thibodeau
*Assistant Examiner*—Stephen Sand
*Attorney, Agent, or Firm*—Fay, Sharpe, Beall, Fagan, Minnich & McKee

[57] ABSTRACT

A longitudinal magnetic recording medium with a good overwrite property and a small medium noise is identified by a CRP value, which is defined by $$CRP = [H_c(R) \times H_c(P)]/[H_c(C)]^2$$

where $H_c(C)$ is a coercive force in the recording direction, $H_c(R)$ is a coercive force in the medium plane in a direction perpendicular to the recording direction, and $H_c(P)$ is a coercive force in the direction of medium thickness. The magnetic recording medium can be a disk with a magnetic recording layer formed by physical vapor deposition or spin coating.

8 Claims, 6 Drawing Sheets

LONGITUDINAL MAGNETIC RECORDING MEDIUM EXHIBITING VARIOUS COERCIVITIY RELATIONSHIPS

FIELD OF INDUSTRIAL APPLICATION

The present invention relates to a longitudinal magnetic recording medium and more specifically to a longitudinal magnetic recording medium for a magnetic disk recording device having a magnetic read/write head.

BACKGROUND OF THE INVENTION

As discussed in a research paper, Telecommunications Society, Magnetic Recording Research Group, research data MR67-18 (1967), pages 1 to 16, the magnetic properties of longitudinal magnetic recording media are defined by the thickness $t_m$ of the recording medium, the coercive force in the direction of travel of the magnetic head, the remanence magnetization $M_r$, and the square ratio $S_q$ ($S_q=M_r/M_s$ where $M_s$ is the saturation magnetization).

IEEE Transaction on Magnetics, MAG-20, No. 1, JANUARY 1984, pages 81 to 83, proposes various symbols such as an S* representing an inclination of magnetization curve for the coercive force, S' representing an inclination of magnetization curve for the remanence coercive force in the remanence magnetization curves, a value $\Delta h_c$ obtained by normalizing the full-width at half maximum $h_c$ of the differential magnetization curve by the coercive force, and a value $\Delta h_r$ obtained by normalizing the full-width at half maximum $h_r$ of the differential magnetization curve by the remanence coercive force. These properties are defined as shown by the diagram in FIG. 1. In FIG. 1, symbol M indicates an amplitude of magnetization, H an applied magnetic field, $H_r$ a remanence coercive force, and $H_s$ an intensity of the applied magnetic field in the major loop of hysteresis at which the magnetization produced when the applied magnetic field increases begins to match or separate from the magnetization produced when the applied magnetic field decreases.

SUMMARY OF THE INVENTION

These symbols representing the properties of conventional magnetic recording media, however, concern only the direction of recording. Since symbols are not known that represent the recording and reproducing properties, particularly those symbols that indicate the recording medium property having a good correlation between the overwrite property and the medium noise level, no guidelines have been set forth regarding the method of obtaining high recording density media that have a good overwrite property and a low medium noise level.

The overwrite property improves as the magnetization of the recording medium becomes easier to be switched. Because the ease of magnetization switching in the direction of travel of the magnetic head can be represented, as mentioned above, by the coercive force $H_c(C)$ in the direction of recording, research has often been made about the relationship between the overwrite property and the coercive force $H_c(C)$ in the recording direction. Recording performed by using a magnetic head involves applying a write current to the magnetic head to generate a magnetic field and thereby switch the magnetization of the recording medium. The magnetic field thus generated includes not only a component parallel to the magnetic head travel direction but also those components perpendicular to the magnetic head travel direction in the medium plane and those in the direction of magnetic layer thickness. To measure the medium properties, it is a common practice to measure the coercive force $H_c(C)$ in the recording direction by applying a uniform magnetic field. Therefore, when recording with a magnetic head, the medium's magnetization switching does not necessarily have an improved correlation with the coercive force $H_c(C)$ in the recording direction. As a result, even if the recording media have the same coercive force $H_c(C)$, they may have different overwrite properties.

If the magnetization of a recording medium has components that are not parallel to the magnetic head travel direction, the medium noise level will increase due to the influence of these components. Therefore, it is necessary to define a recording medium symbol that represents a property that takes into account the ease of magnetization switching in the recording medium not only in the direction of magnetic head travel but also in the direction perpendicular to the head travel and in the direction of recording layer or magnetic head thickness. Among the symbols that are known to represent the magnetization orientation in a recording medium are a square ratio $S_q(C)$ in the recording direction, and a ratio OR between the square ratio $S_q(C)$ in the recording direction and the square ratio $S_q(R)$ in the direction perpendicular to the recording direction, i.e. $OR=S_q(C)/S_q(R)$. These symbols do not define the component in the direction of thickness and thus do not necessarily represent the ease of magnetization switching in the recording medium.

The symbols shown in afore-mentioned IEEE Transactions on Magnetics paper to represent the properties of a recording medium do not reveal the correlation among the overwrite property, the medium noise level and the recording medium properties with a sufficiently high precision and sometimes cannot provide a correlation at all. As another symbol representing the recording medium property, there is the magnitude of applied magnetic field $H_s$ at which the magnetization when the applied magnetic field increases and the magnetization when the applied magnetic field decreases begin to agree with or separate from each other. This symbol, however, considers only the correlation with the recording magnetizing force, as mentioned in the Telecommunications Society, Magnetic Recording Research Group, research data MR67-18 (1967), pages 1 to 15.

The object of this invention is to define or identify symbols that correctly represent the correlation between the overwrite property and the medium noise level and then to optimize these properties so as to reliably and easily obtain a longitudinal magnetic recording medium that has a good overwrite property and a small medium noise.

This invention is characterized in that the overwrite property of a longitudinal magnetic recording medium and the medium noise are determined on the basis of a CRP value, which is defined by $$CRP=[H_c(R) \times H_c(P)]/[H_c(C)]^2$$

where $H_c(C)$ is a coercive force in a recording direction, $H_c(R)$ is a coercive force in the medium plane in a direction perpendicular to the recording direction, and $H_c(P)$ is a coercive force in the direction of magnetic layer thickness.

With this invention, it is possible to obtain a longitudinal magnetic recording medium in which the overwrite property is improved and the medium noise level is reduced as the CRP value decreases even when the coercive force $H_c(C)$ in the recording direction remains the same. By measuring a coercive force $H_c(C)$ in the recording direction, a coercive force $H_c(R)$ in a direction perpendicular to the recording direction, and a coercive force $H_c(P)$ in the direction of thickness to determine the CRP value and using the CRP value as a symbol of the recording medium property, it is possible to obtain a longitudinal magnetic recording medium with a good overwrite property with a small medium noise level. This relationship generally holds both for longitudinal magnetic recording media with a magnetic layer formed by applying a magnetic coating composed mainly of magnetic powder to a substrate and for longitudinal magnetic recording media with a magnetic layer formed by physical vapor deposition of magnetic material over a substrate. For the longitudinal magnetic recording media whose magnetic layer is formed by applying magnetic coating composed mainly of magnetic powder to the substrate, the CRP value is set to less than 0.5, for a good recording media whose magnetic layer is formed by physical vapor deposition of magnetic material over the substrate, a satisfactory medium property can be obtained by setting the CRP value to less than 0.1.

DETAILED DESCRIPTION OF THE PREFERRED EMBODIMENTS

Figure 1:
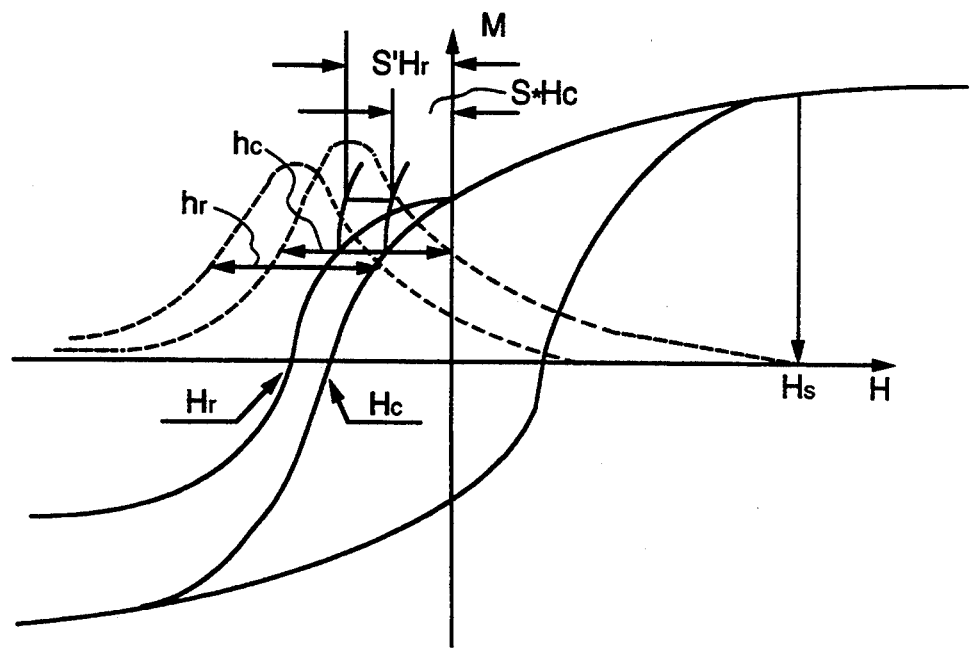
FIG. 1 is a diagram showing symbols that represent magnetic properties of longitudinal magnetic recording media.

The longitudinal magnetic recording medium and the method of manufacture thereof as one embodiment of this invention will be described by referring to FIGS. 2 through 9.

The overwrite property of the longitudinal magnetic recording medium is defined by the ratio of a fundamental component $E_{1fi}$ of a low-frequency signal written first and a remainder $E_{1fr}$ of the fundamental component $E_{1fi}$ when the fundamental component is overwritten by a high-frequency signal $E_{2f}$, as given by the expression shown below.

$$OW_{n'n} = -20 \log (E_{1fr}/E_{1fi})$$

This means that the smaller the value of $OW_{n'n}$ the better the overwrite property will be.

Experiments were conducted repetitively on the coercive force $H_c$ of the magnetic layer in the longitudinal magnetic recording medium by measuring not only the coercive force $H_c(C)$ in the recording direction but also a coercive force $H_c(R)$ in the medium plane in a direction perpendicular to the recording direction and a coercive force $H_c(P)$ in a direction of thickness, and studied the correlation between the overwrite property and the medium noise.

The study involved preparing a magnetic recording medium with a magnetic layer formed by applying a magnetic coating material including magnetic powder to a substrate, and measuring a write current value of the magnetic head for the recording medium. The prepared longitudinal magnetic recording media have their magnetic layers formed by applying a magnetic coating material composed mainly of hexagonal ferrite powder to a substrate. They have the same coercive forces $H_c(C)$ in the directions of magnetic layer thickness and magnetic head travel but have different orientations of magnetic field for the magnetic layer. The measured write current value $I_w$ of the magnetic head is such that the $OW_{n'n}$ value is $-26$ dB. This $I_w$ value ($-26$ dB) represents the magnetomotive force of the magnetic head required to obtain the same overwrite properties. The overwrite property improves as the $I_w$ value ($-26$ dB) gets smaller. In each of the longitudinal magnetic recording media, the relationship among the $I_w$ ($-26$ dB) value, the coercive force $H_c(C)$ in the magnetic head travel direction, the coercive force $H_c(R)$ in the medium plane in a direction perpendicular to the magnetic head travel, and the coercive force $H_c(P)$ in a direction of medium thickness was examined. The CRP value, which is defined below, was determined.

$$CRP = [H_c(R) \times H_c(P)]/[H_c(C)]^2$$

From the correlation between the CRP value and the $I_w$ ($-26$ dB) value for each longitudinal magnetic recording medium, it was verified that as the CRP value decreases, the $I_w$ ($-26$ dB) value also decreases, i.e. the overwrite property improves as the CRP value becomes small, even if the media have the same coercive force $H_c(C)$ in the magnetic head travel direction. Then, a correlation was determined between the CRP value and the medium noise in the longitudinal magnetic recording media and it was found that as the CRP value becomes small, the normalized medium noise $N_d/E_0$—where $N_d$ is a medium noise and E is an isolated pulse amplitude value—also decreases.

In addition to the longitudinal magnetic recording media whose magnetic layers are formed by applying magnetic powder to the substrates, other longitudinal magnetic recording media whose magnetic layers are formed by physical vapor deposition of a magnetic material over the substrates—more specifically those recording media having magnetic layers made of Co alloy thin film but which have different deposition rates of underlayers for the magnetic layers—were prepared in order to examine the correlations between the overwrite property and the CRP value and between the medium noise and the CRP value. The examination revealed that even when the coercive forces $H_c(C)$ in the magnetic head travel direction are equal, as the CRP value decreases, the $I_w$ (−26 dB) value and the normalized medium noise $N_d/E_0$ also decrease. In other words it was confirmed that the longitudinal magnetic recording medium has a better overwrite property and a smaller medium noise as the CRP value becomes smaller.

The study also found that a preferred CRP value for the longitudinal magnetic recording media whose magnetic layers are formed by applying magnetic coating material is CRP $\leq 0.5$ and that for the longitudinal magnetic recording media with magnetic layers formed by physical vapor deposition is CRP $\leq 0.1$.

In the recording media of this kind, it is necessary that the coercive force $H_c(P)$ in the medium thickness direction be smaller than both the coercive force $H_c(C)$ in the magnetic head travel direction and the coercive force $H_c(R)$ in the medium plane in a direction perpendicular to the magnetic head travel and that the coercive force $H_c(C)$ in the magnetic head travel direction be larger than the coercive force $H_c(R)$ in the medium plane in a direction perpendicular to the magnetic head travel. The following relationship holds among the coercive force $H_c(C)$ in the magnetic head travel direction, the coercive force $H_c(R)$ in the medium plane in a direction perpendicular to the magnetic head travel, and the coercive force $H_c(P)$ in the direction of medium thickness.

$$H_c(P) \leq H_c(R) \leq H_c(C)$$

Since $H_c(R)/H_c(C) \leq 1$ and $H_c(P)/H_c(C) \leq 1$, it follows that the CRP value should preferably be $$CRP = [H_c(R) \times H_c(P)]/[H_c(C)]^2 \leq 1$$

However, the test results show that when the CRP value becomes less than 0.5 for the longitudinal magnetic recording media whose magnetic layers are formed by applying magnetic coating material or less than 0.1 for the longitudinal magnetic recording media whose magnetic layers are formed by physical vapor deposition, the improvement of the overwrite property and the reduction in the medium noise become conspicuous. Examination of the CRP values of conventional longitudinal magnetic recording media has found that many of the longitudinal magnetic recording media whose magnetic layers are formed by applying magnetic coating material have CRP values of around 0.8 and those with magnetic layers formed by physical vapor deposition often have CRP values of around 0.3. From this, it is obvious that the preferred CRP value for the longitudinal magnetic recording media having magnetic layers formed by the application of magnetic coating material is CRP $\leq 0.5$ and that for longitudinal magnetic recording media having magnetic layers formed by physical vapor deposition is CRP $\leq 0.1$. This relationship becomes more effective as the thickness of the magnetic layer decreases. It is particularly effective when the magnetic layer thickness is less than 30 nm. It should also be noted that for the thicknesses less than 10 nm, there are variations in magnetic properties.

Figure 2:
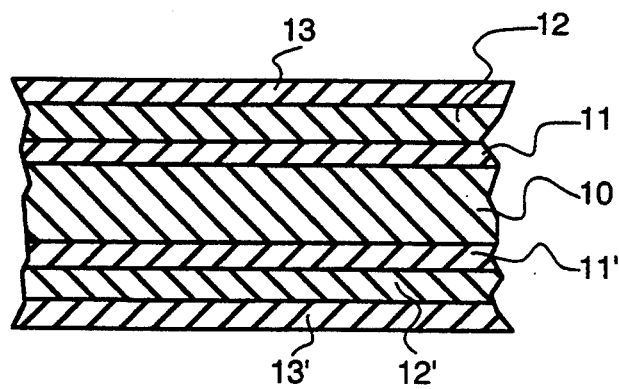
FIG. 2 is an explanatory view showing the cross section of a first embodiment of a magnetic disk for disk type recording equipment constructed of the longitudinal magnetic recording medium manufactured according to this invention, in which the magnetic layer is formed by magnetic coating.

FIG. 2 shows a disk type recording medium, for example hard disk, for magnetic disk recording equipment as one example of the intraplane magnetic recording medium according to this invention, in which the magnetic layer is formed by applying magnetic coating material to the substrate.

The disk type magnetic recording medium shown in FIG. 2 has an underlayer 11, a magnetic layer 12 and a lubrication layer 13 formed on one side of a substrate 10 and, on the other side, an underlayer 11', a magnetic layer 12' and a lubrication layer 13'. The substrate 10 is made of a nonmagnetic material such as chemically stressed glass, ceramic, Al alloy plated with Ni-P (10 $\mu$m thick), synthetic resin, glassy carbon, and Ti alloy. Alternatively, the substrate can be of a magnetic material. The magnetic layers 12, 12' are formed by applying magnetic coating material composed of magnetic powder, binder and additive to the underlayer. The layers 11, 11' are preferably composed of chromite and/or almite, and are formed on the substrate. Chromite can, for example, be chromic oxide. The magnetic powder is a $\gamma$-$Fe_2O_3$, Co-$\gamma$-$Fe_2O_3$, $CrO_2$, hexagonal ferrite such as barium ferrite, and $Fe_3O_4$. The binder may be a thermoplastic resin or a thermosetting resin, or a mixture of these. For example, the binder may be formed of an epoxy resin, polyurethane resin, polyamide resin, silicone resin, polyester resin, phenol resin, vinyl resin, cellulose derivative, acrylic or methacrylic homopolymer or copolymer, nylon resin, alkyd resin, urea resin, or urea formaldehyde resin, or a combination of these resins. Particularly a mixture of epoxy resin, phenol resin and vinyl resin form an excellent binder of this kind. The additive may be magnetic powder dispersants including various kinds of surface-active agents and coupling agents, leveling agents, reinforcement materials such as alumina particles, cross-linking agents and other modifiers. The lubrication layers 13, 13' are formed of a perfluoropolyether lubricant or higher fatty acid ester.

In this example, the magnetic layer was formed of a magnetic coating material composed of barium ferrite powder, epoxy resin, phenol resin and polyvinyl butyrate (PVB). The disk type magnetic recording medium was manufactured by first preparing a magnetic coating material. The magnetic coating material was made by milling (with a ball mill) a composition made up of 60 parts by weight of magnetic powder of barium ferrite with a coercive force of 900 ($O_e$) (Orsted), 14 parts of epoxy resin as a binder, 14 parts of phenol resin, 12 parts of polyvinyl butyrate (PVB), and 400 parts of cyclohexanone as a solvent. The magnetic coating material was applied over an aluminum disk with a diameter of 5.25 inch (about 130 mm) so that the thickness of the magnetic coating after thermosetting became 0.5 $\mu$m. The spin coating was performed by rotating the disk during the coating. During the spin coating, the magnetic field was oriented.

Figure 4:
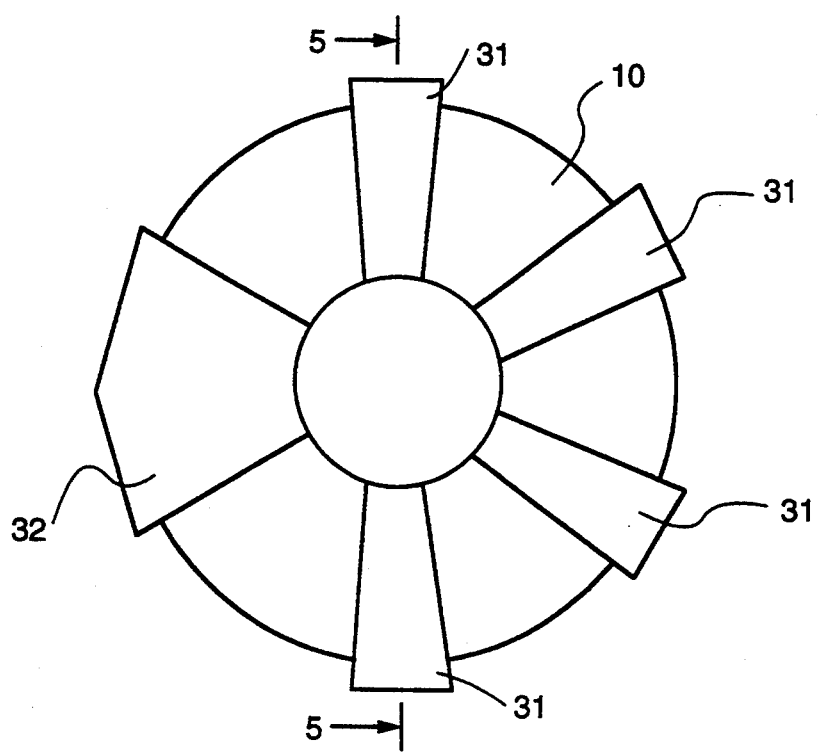
FIG. 4 is a view of a device orienting the magnetic field in the recording medium of FIG. 2.
Figure 5:
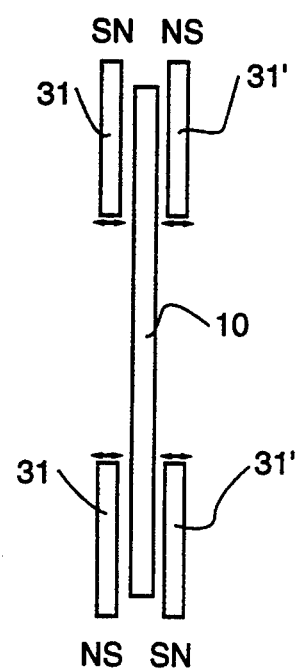
FIG. 5 is a partial sectional view taken along line 5—5 in FIG. 4 showing the positional relationship between the magnets and the recording medium.

The magnetic field orientation of the disk can be performed by the device shown diagramatically in FIGS. 4 and 5. The device includes a mechanism for holding and rotating a disk 10, and permanent magnets disposed on both sides of the disk type recording medium 10. A group of magnets disposed on one side of the disk type recording medium 10 includes four small permanent magnets 31 and one large permanent magnet 32 supported on a movable mount (not shown) so that their separation distances with respect to the magnetic coating on the disk can be changed by moving the mount. Another group of magnets located on the other side of the disk type recording medium 10 includes four small permanent magnets and one large permanent magnet. As shown in FIG. 5, the small permanent magnets 31' on the second side are located at positions corresponding to those of the permanent magnets 31 with the disk type recording medium 10 interposed therebetween. The large permanent magnet is also disposed facing the corresponding large permanent magnet 32 with the disk type recording medium 10 interposed. These permanent magnets on the second side are supported on a movable mount so that their separation distance with respect to the magnetic coating on the disk can be changed by moving the mount. The permanent magnets are formed of Sm-Co alloy, Nd-Fe-B alloy or $BaFe_2O_3$ alloy.

The magnetic field orientation was performed for each disk by changing the distance between the magnetic coating and the permanent magnet in the range of 1.5 mm at maximum to 0.5 mm at minimum to produce six kinds of disks with different CRP values. The kinds of permanent magnets used in the magnetic field orientation, the distances between the permanent magnets and the magnetic coatings, and CRP values that were determined are shown in Table 1.

TABLE 1

| Specimen number | Kind of magnet | Distance between magnet and coating | CRP value |
|---|---|---|---|
| 1 | Sm—Co alloy | 1.5 mm | 0.98 |
| 2 | Sm—Co alloy | 1.0 mm | 0.70 |
| 3 | Sm—Co alloy | 0.5 mm | 0.40 |
| 4 | Nd—Fe—B alloy | 1.5 mm | 0.60 |
| 5 | Nd—Fe—B alloy | 1.0 mm | 0.18 |
| 6 | Nd—Fe—B alloy | 0.5 mm | 0.06 |

The disks that had undergone the magnetic field orientation were spin coated until the thermoset magnetic coating obtained a thickness of 0.35 μm. The disks were then successively placed in a test bed, where their read and write performance was measured by using a magnetic head with a gap length of 0.4 μm. The linear recording density was set at 30 kFCI, which corresponds to high frequency signals. The CRP value for each disk, the $I_w(-26$ dB) value representing the overwrite property, and the normalized medium noise $N_d/E_0$ are as shown in Table 2.

TABLE 2

| Specimen number | CRP value | $I_w(-26$ dB) value $(mA_{pp})$ | Normalized medium noise $N_d/E_0$ $(\mu V_{rms}/\mu V_{pp})$ |
|---|---|---|---|
| 1 | 0.98 | 23.8 | 0.0141 |
| 2 | 0.70 | 19.0 | 0.0135 |
| 3 | 0.40 | 13.5 | 0.0114 |
| 4 | 0.60 | 17.8 | 0.0129 |
| 5 | 0.18 | 8.8 | 0.0112 |
| 6 | 0.06 | 6.0 | 0.0102 |

Figure 6:
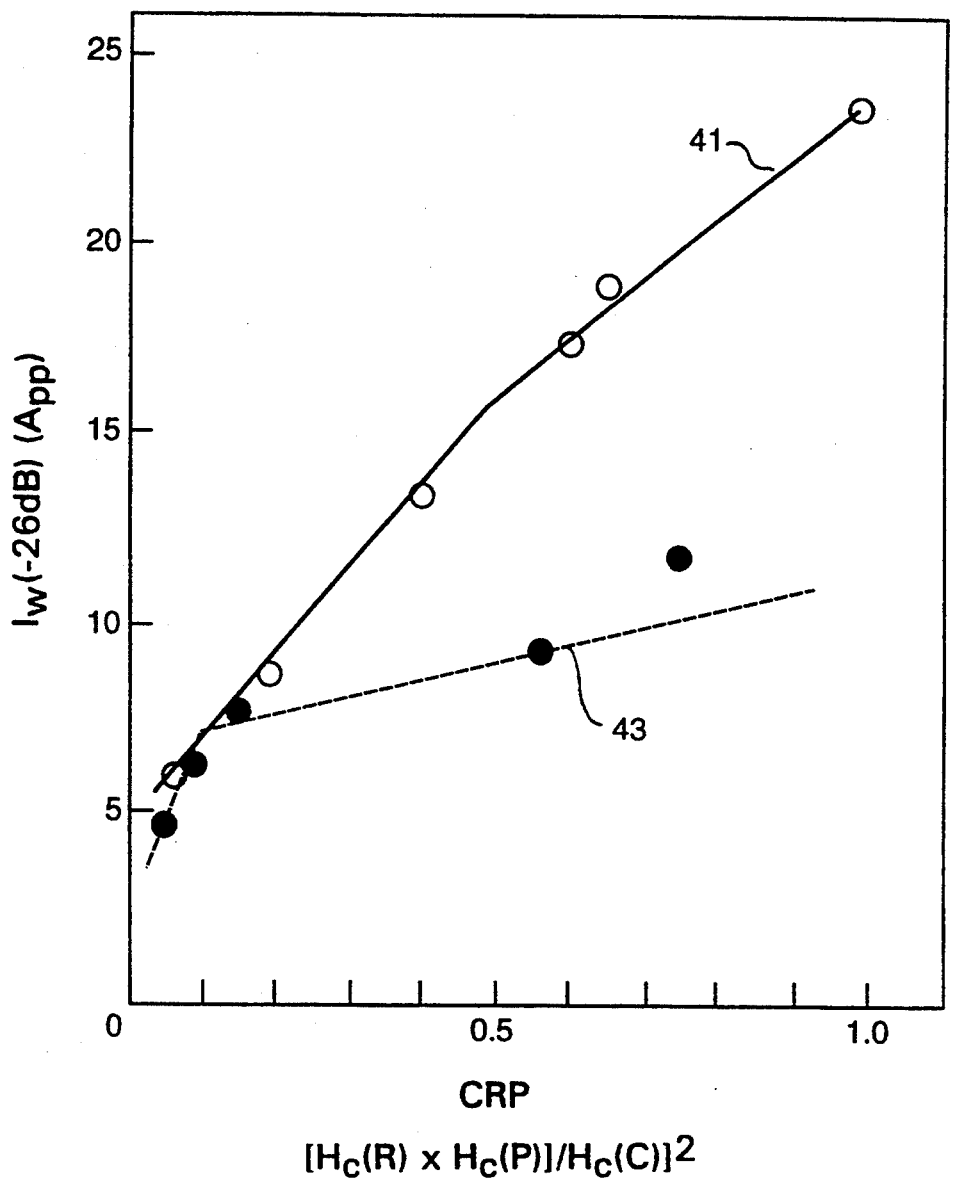
FIG. 6 is a diagram showing the relationship between the CRP value and the overwrite property.
Figure 7:
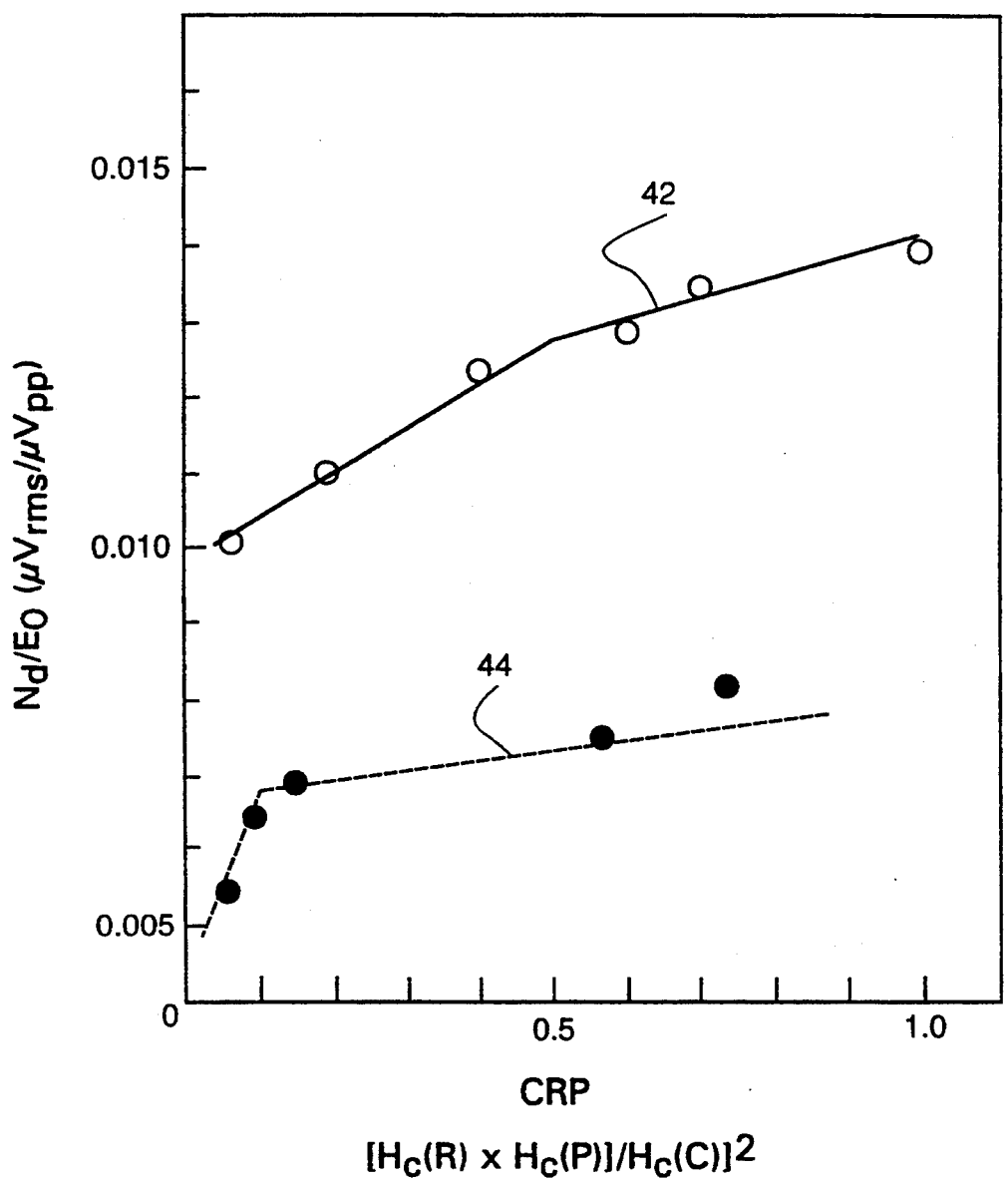
FIG. 7 is a diagram showing the relationship between the CRP value and the medium noise.

In FIG. 6, a line 41 represents the relationship between the $I_w(-26$ dB) value, which is a symbol showing the overwrite property. A line 42 in FIG. 7 represents the relationship between the CRP value and the normalized medium noise $N_d/E_0$. These figures show that with CRP $\leq 0.5$ the overwrite property improves and the medium noise reduction becomes significantly large.

When the magnetic disk recording equipment was formed of a disk type longitudinal magnetic recording medium with CRP $\leq 0.06$, a good overwrite property and a small medium noise were obtained making it possible to detect signals with a high S/N ratio. When the S/N ratio was made equal to that of the conventional magnetic disk recording equipment, the longitudinal recording density increased by more than 1.5 times.

Figure 8:
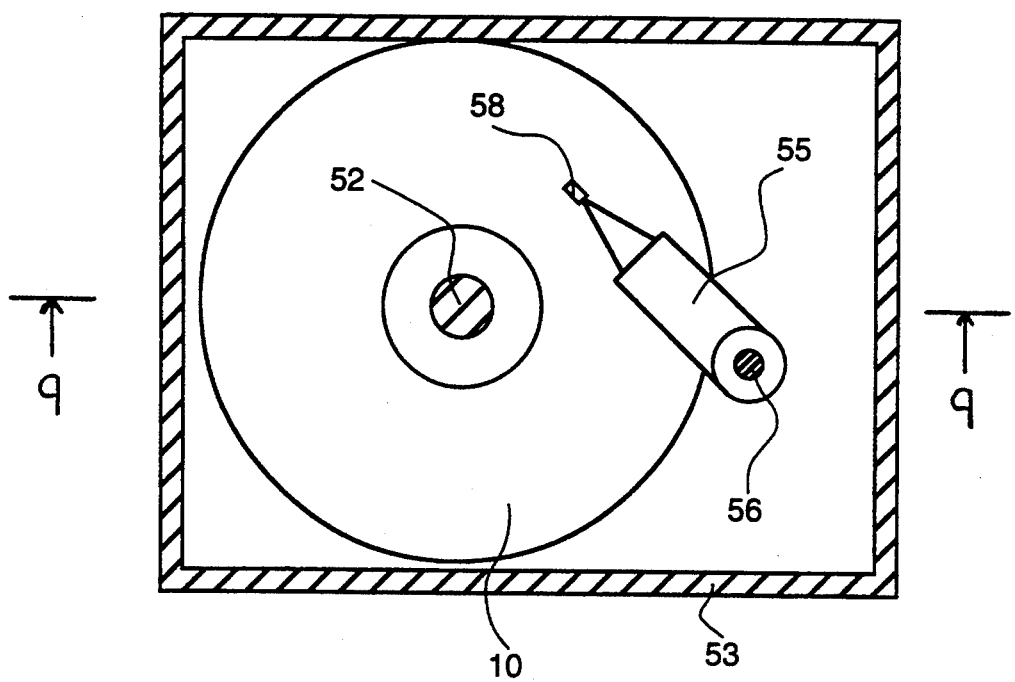
FIG. 8 is an explanatory view showing the construction of the magnetic disk recording equipment using the longitudinal magnetic recording media of this invention as the recording media.
Figure 9:
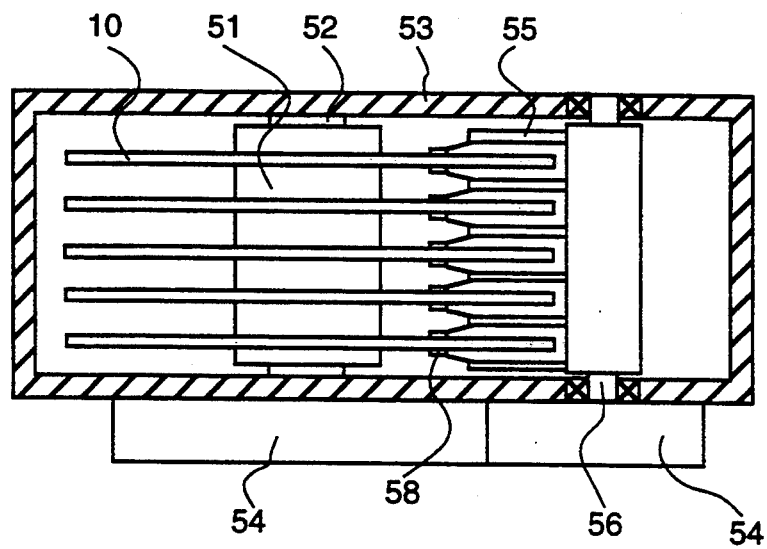
FIG. 9 is a cross section taken along the line 9—9 of FIG. 8.

FIGS. 8 and 9 show the construction of this type of magnetic disk recording equipment. The disks 10 are fixedly mounted on a spindle 52 alternately with spacers 51 and secured to the spindle 52 by a clamp. The spindle 52 is supported on bearings in an enclosure 53 and rotated together with the disks by a motor 54 mounted outside the enclosure. Swing arms 55 are mounted on a rotatable shaft 56, which in turn is supported by bearings in the enclosure 53 so that they can be pivoted about shaft 56 by an actuator 57. A magnetic head 58 consists of a thin-film type magnetic head, or an MIG type magnetic head, or a dual magnetic head that has a thin-film type magnetic head for writing and a magnetoresistance effect device for reading. The magnetic head is preferably formed as one piece and has a slider. The magnetic heads 58 are attached through gimbals to load arms supported on the swing arm 55 so that the rotation of the disks and the pivotal motion of the swing arm 55 move the magnetic heads 58 to any desired location on the disks.

Figure 3:
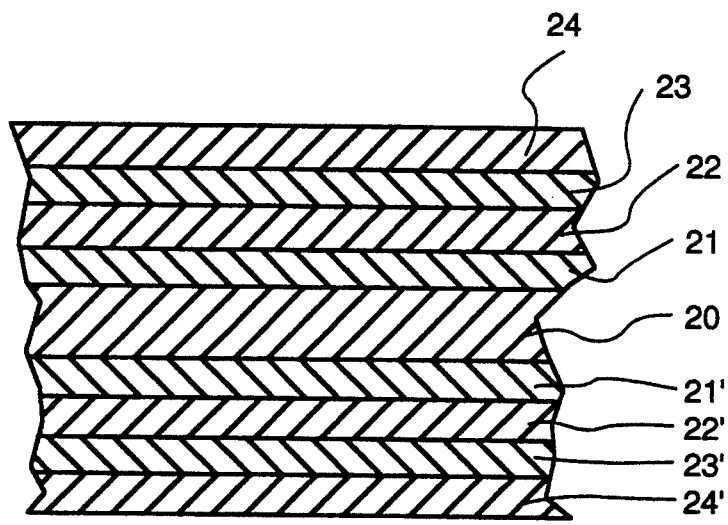
FIG. 3 is an explanatory view showing the cross section of a second embodiment of a magnetic disk for disk type recording equipment constructed of the longitudinal magnetic recording medium manufactured according to this invention, in which the magnetic layer is formed by physical vapor deposition.

FIG. 3 shows another embodiment of the longitudinal magnetic recording medium according to the present invention. In this embodiment, the longitudinal magnetic recording medium is of a disk type formed by physical vapor deposition. On one side of a substrate 20, a non-magnetic underlayer 21, a magnetic layer 22 and a protection layer 23 in that order are formed by physical vapor deposition and then a lubrication layer 24 is formed over the surface of protection layer 23. On the other side of the substrate 21, a non-magnetic layer 21', a magnetic layer 22' and a protection layer 23' are formed by physical vapor deposition in that order and then a lubrication layer 24 is formed over the surface of the protective layer 23'.

The substrate 20 is made of such non-magnetic materials as chemically stressed glass, ceramic, Ni-P plated aluminum alloy, synthetic resin, glassy carbon, and Ti alloy. The underlayers 21, 21' may be formed mainly of chromium; the recording layers 22, 22' may be formed of cobalt magnetic alloy such as Co-10 at. % Cr-4 at. % Ta, Co-30 at. % Ni-7.5 at. % Cr, Co-12 at. % Cr-13 at. % Pt, Co-35 at. % Ni-5 at. % Zr or Co-30 at. % Ni-8 at. % Pt; and protection layers 23, 23' may be made of C, WC, (WMo)C, $B_4C$ and hydrogen-containing carbon. The lubrication layers 24, 24' may be made of perfluoroalkylpolyether. Physical vapor deposition techniques include dc magnetron sputtering, ordinary radio frequency sputtering, radio frequency magnetron sputtering, focused target sputtering, and vacuum evaporation. The magnetron sputtering method may be of either the permanent magnet or electromagnetic type.

In this example, the substrate 20 is made of Al-Mg alloy; the underlayers 21, 21' are made mainly of chromium; and the magnetic layers 22, 22' are formed of Co-12 at. % Cr-2 at. % Ta. The recording medium is manufactured by first preparing a substrate made of Al-Mg alloy with the outer diameter of 95 mm (3.5 inches), plating Ni-P over the both surfaces of the substrate to a thickness of 12 μm, and texturing it. The texturing forms fine grooves concentrically in the plated surface of the substrate with the average intervals along the center line of about 5 nm. The textured substrate is washed and cleaned. The washed substrate is then heated in a vacuum of $10^{-7}$ to $10^{-8}$ Torr base pressure) to at least 200° C. (for a glass substrate the temperature can be increased), and is subjected to dc magnetron sputtering with an argon gas pressure of approximately 2 mTorr and argon gas flow of 200 CCM to form an underlayer composed mainly of chromium to a thickness of 50 nm. At this time, the substrate transfer speed and the underlayer thickness are kept constant, with the shield mask plate varied in width and the applied power density changed.

The deposition rate of the underlayer depends on many parameters of the deposition process as well as the materials used for the substrate and the pretreatment of the substrate. In the deposition process, the temperature of the substrate is related to the substrate material. The rate of deposition is effected by the substrate temperature, the base pressure of the vacuum before the Ar gas is introduced, the sputtering gas pressure and flow and the method of deposition, such as transfer deposition or static deposition and whether the sputtering is bias or non-bias sputtering. In this example, the transfer speed affects the rate of deposition of the underlayer and the shield mask plate is varied in width as one embodiment of varying the deposition rate. The example of the invention is given for illustration of the correlation between underlayer deposition rate and CRP value. In this example, the specimens were subjected to the same parameters of deposition and the shield mask plate was varied in width and the applied power density changed in order to change the underlayer deposition rate.

The table 3 below shows the underlayer deposition rate of the disk type recording medium, the coercive force $H_c(C)$ in the magnetic head travel direction, the coercive force $H_c(R)$ in the medium plane in a direction perpendicular to the magnetic head travel direction, the coercive force $H_c(P)$ in the direction of medium thickness, and the CRP value.

TABLE 3

| Specimen number | Underlayer deposition rate (nm/sec) | $H_c(C)$ (Oe) | $H_c(R)$ (Oe) | $H_c(P)$ (Oe) | CRP value |
|---|---|---|---|---|---|
| 1 | 1.1 | 1134 | 1097 | 668 | 0.57 |
| 2 | 2.2 | 1130 | 1050 | 182 | 0.15 |
| 3 | 3.5 | 1125 | 1032 | 96 | 0.08 |
| 4 | 4.0 | 1120 | 1025 | 61 | 0.05 |
| 5 | 7.0 | 860 | 860 | 650 | 0.76 |

Each of the specimens of this example has a different underlayer deposition rate. Specimens 2, 3 and 4 have an underlayer deposition rate of 2.2 to 4.0 nm/sec., which provide a desirable CRP value, as shown in Table 3.

Each of the disk recording media thus formed with the underlayer is then provided with a 25 nm magnetic layer of a magnetic alloy of Co-12 at. % Cr-2 at. % Ta by the dc magnetron method. Then over the magnetic layer is formed a protective layer of hydrogen-containing carbon to a thickness of 20–35 nm. The protection layer is further coated with a lubrication layer 5 nm thick.

The disk type recording media are then put in the test bed where measurements are taken of the recording and reproducing properties at the linear recording density of 30 kFCI corresponding to high frequency signals by using a magnetic head with a gap length of 0.4 μm.

Table 4 below shows the CRP value, $I_w(-26\text{ dB})$ value and normalized medium noise $N_d/E_0$ for each disk type recording medium.

TABLE 4

| Specimen number | CRP value | $I_w(-26\text{ dB})$ value ($mA_{pp}$) | Normalized medium noise $N_d/E_0$ ($\mu V_{rms}/\mu V_{pp}$) |
|---|---|---|---|
| 1 | 0.57 | 9.5 | 0.0075 |
| 2 | 0.15 | 7.8 | 0.0069 |
| 3 | 0.08 | 6.5 | 0.0065 |
| 4 | 0.05 | 4.8 | 0.0055 |
| 5 | 0.76 | 11.0 | 0.0080 |

The line 43 in FIG. 6 shows the relationship between the CRP value and the $I_w(-26\text{ dB})$, a symbol representing the overwrite property of these disks, and line 44 in FIG. 7 shows the relationship between the CRP value and the normalized medium noise $N_d/E_0$. From these figures it is obvious that with CRP $\leq 0.1$, the improvement of the overwrite property and the reduction of the medium noise become apparent. As with the first embodiment, a disk manufactured according to the second embodiment of the present invention with CRP $\leq 0.1$ has an excellent overwrite property with low noise, making it possible to detect signals at high S/N ratios. Hence, when the S/N ratio is kept at the same level as that of the longitudinal magnetic recording media used in conventional magnetic disk recording equipment, the longitudinal recording density is increased by more than 1.5 times.

As described in the foregoing, the longitudinal magnetic recording medium of this invention has a good overwrite property with low noise, so that when it is used for example as a magnetic disk for magnetic disk recording equipment, signal detection can be performed at high S/N ratios. By setting the S/N ratio equal to that of the conventional magnetic disk recording equipment, it is possible to increase the recording density and thereby the recording capacity.

We claim:

1. A longitudinal magnetic recording medium having a substrate and a magnetic layer formed on the substrate by applying a magnetic coating material, containing a magnetic powder mixed with a binder, comprising:
said medium having a CRP value of 0.5 or less, wherein the CRP value is defined by $$CRP = [H_c(R) \times H_c(P)]/[H_c(C)]^2$$

where $H_c(C)$ represents a coercive force in a recording direction, $H_c(R)$ represents a coercive force in the medium plane in a direction perpendicular to the recording direction, and $H_c(P)$ represents a coercive force in a direction of medium thickness, wherein $H_c(P) \leq H_c(R) \leq H_c(C)$.

2. A longitudinal magnetic recording medium as claimed in claim 1, wherein said magnetic powder is barium ferrite.

3. A longitudinal magnetic recording medium as claimed in claim 1, wherein the magnetic powder is one selected from the group consisting of $Fe_3O_4$, $\gamma\text{-}Fe_2O_3$, $Co\text{-}\gamma\text{-}Fe_2O_3$, and $CrO_2$.

4. A longitudinal magnetic recording medium as claimed in claim 1, wherein the substrate is a disk and the magnetic layer is spin coated on the substrate, and wherein the magnetic layer is further oriented in a magnetic field during the spin coating.

5. A longitudinal magnetic recording medium according to claim 4, wherein the magnetic layer is formed of a magnetic powder mixed with a binder for binding the powder to the substrate, and wherein said magnetic powder is barium ferrite.

6. A longitudinal magnetic recording medium having a substrate, an underlayer and a magnetic recording layer formed by physical vapor deposition of a magnetic material onto said underlayer, comprising:

said medium having a CRP value of 0.1 or less, wherein the CRP value is defined by $$CRP=[H_c(R) \times H_c(P)]/[H_c(C)]^2$$

where $H_c(C)$ represents a coercive force in a recording direction, $H_c(R)$ represents a coercive force in the medium plane in a direction perpendicular to the recording direction, and $H_c(P)$ represents a coercive force in a direction of medium thickness, wherein $H_c(P) \leq H_c(R) \leq H_c(C)$.

7. A longitudinal magnetic recording medium as claimed in claim 6, wherein the magnetic layer is formed of a cobalt alloy.

8. A longitudinal magnetic recording medium as claimed in claim 6, said substrate being a disk, said underlayer being formed on both sides of said disk and said magnetic layer being formed on each underlayer and having a lubricating layer formed thereon.

* * * * *